US008913291B2

(12) United States Patent
Arimoto

(10) Patent No.: US 8,913,291 B2
(45) Date of Patent: Dec. 16, 2014

(54) IMAGE PROCESSING APPARATUS FOR VIEWING PROGRESS STATUS OF IMAGE OUTPUT PROCESSING

(71) Applicant: Hideki Arimoto, Nagoya (JP)

(72) Inventor: Hideki Arimoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/752,136

(22) Filed: Jan. 28, 2013

(65) Prior Publication Data

US 2013/0135657 A1 May 30, 2013

Related U.S. Application Data

(63) Continuation of application No. 11/689,236, filed on Mar. 21, 2007, now Pat. No. 8,363,266.

(30) Foreign Application Priority Data

Mar. 24, 2006 (JP) ................................ 2006-084257

(51) Int. Cl.
*G06F 15/00* (2006.01)
*G06K 1/00* (2006.01)
*G06F 3/12* (2006.01)
*G06K 15/00* (2006.01)
*H04N 1/00* (2006.01)
*H04N 1/40* (2006.01)

(52) U.S. Cl.
CPC ....... *H04N 1/00042* (2013.01); *H04N 1/00408* (2013.01); *H04N 1/0044* (2013.01); *H04N 1/00442* (2013.01); *H04N 1/00448* (2013.01); *H04N 1/00477* (2013.01); *H04N 1/40* (2013.01); *H04N 2201/0094* (2013.01)
USPC .......................... 358/1.9; 358/1.15; 358/1.12

(58) Field of Classification Search
None
See application file for complete search history.

(56) References Cited

U.S. PATENT DOCUMENTS

| 6,895,552 B1 * | 5/2005 | Balabanovic et al. ........ 715/209 |
| 2002/0054352 A1 | 5/2002 | Shibasaki |

(Continued)

FOREIGN PATENT DOCUMENTS

| JP | S57-166772 A | 10/1982 |
| JP | H04-181860 A | 6/1992 |

(Continued)

OTHER PUBLICATIONS

Japan Patent Office, Office Action from priority counterpart Patent Application No. JP 2006-084257, mailed Jan. 19, 2009. [Submitted with Parent].

*Primary Examiner* — Ming Hon
(74) *Attorney, Agent, or Firm* — Baker Botts L.L.P.

(57) ABSTRACT

An image processing apparatus includes: a display and a display controller that controls the display to display thereon a page. When a first processing is currently performed on the page, the page includes: a first part, on which the first processing has not yet been performed; and a second part, on which the first processing has already been performed. When a second processing is currently performed on the page, the page includes: a third part, on which the second processing has not yet been performed; and a fourth part, on which the second processing has already been performed. The display controller controls the display to display the first part and the second part in different display modes. The display controller controls the display to display the third part and the fourth part in different display modes.

13 Claims, 13 Drawing Sheets

(56) References Cited

U.S. PATENT DOCUMENTS

| | | |
|---|---|---|
| 2002/0071689 A1 | 6/2002 | Miyamoto |
| 2003/0076322 A1* | 4/2003 | Ouzts et al. ............ 345/440 |
| 2003/0076527 A1 | 4/2003 | Simpson et al. |
| 2004/0021896 A1 | 2/2004 | Chen |
| 2004/0042049 A1 | 3/2004 | Hulan et al. |
| 2004/0145768 A1 | 7/2004 | Stringham |
| 2004/0179234 A1 | 9/2004 | Yoshitani |
| 2006/0001920 A1* | 1/2006 | Moreno et al. ............ 358/498 |
| 2006/0146383 A1* | 7/2006 | Yun .................... 358/527 |

FOREIGN PATENT DOCUMENTS

| | | |
|---|---|---|
| JP | H05-047028 B2 | 7/1993 |
| JP | H05-327988 A | 12/1993 |
| JP | H09-008980 A | 1/1997 |
| JP | H10-187401 A | 7/1998 |
| JP | 2004-023602 A | 1/2004 |
| JP | 2004-282382 A | 10/2004 |

* cited by examiner

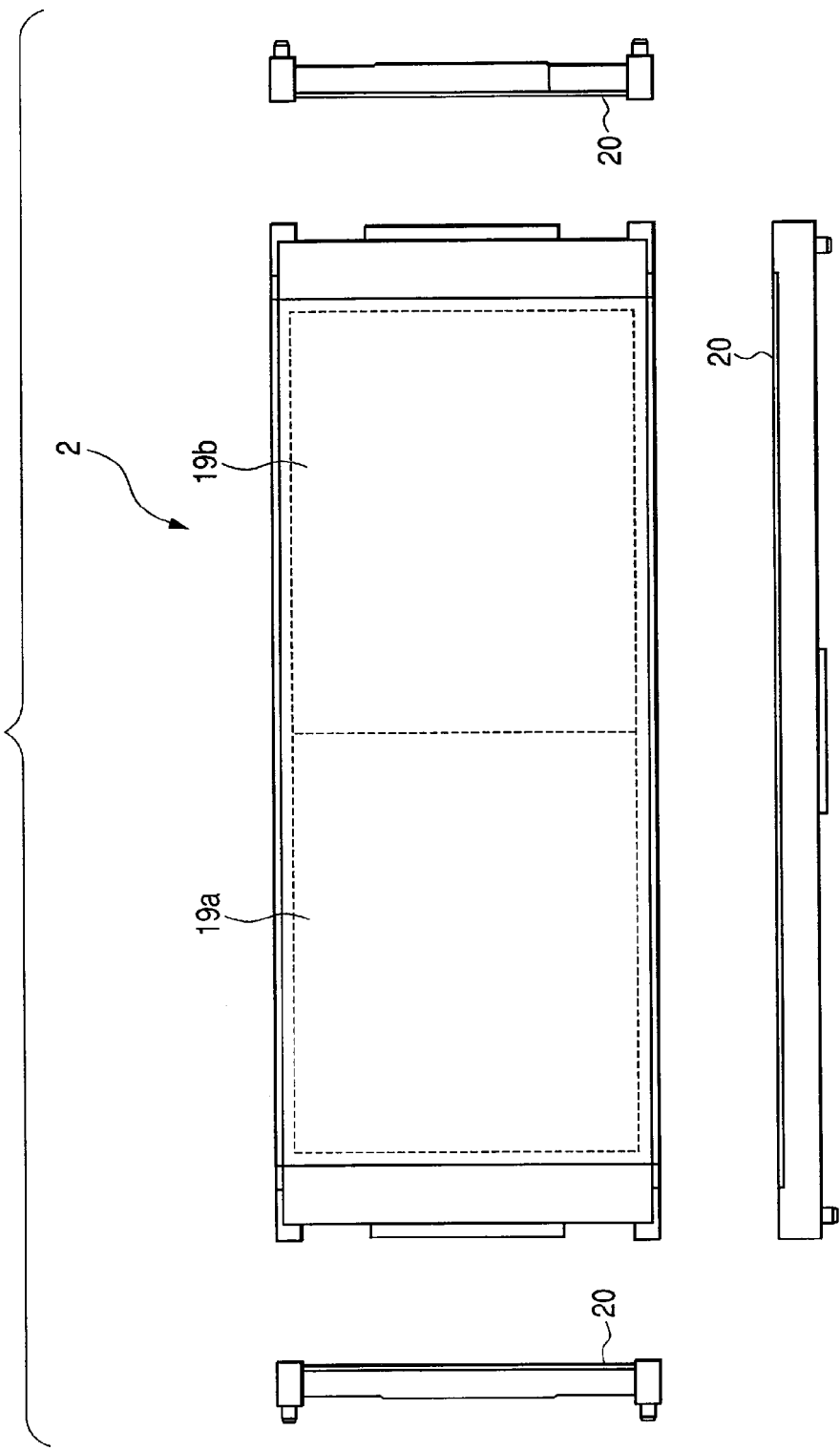

FIG. 12
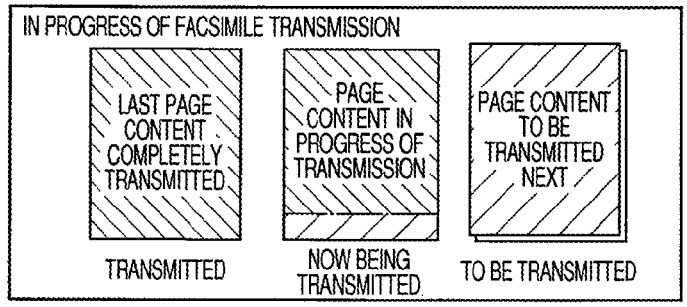
(e) SCANNER INPUT IS MADE AT NEXT PAGE
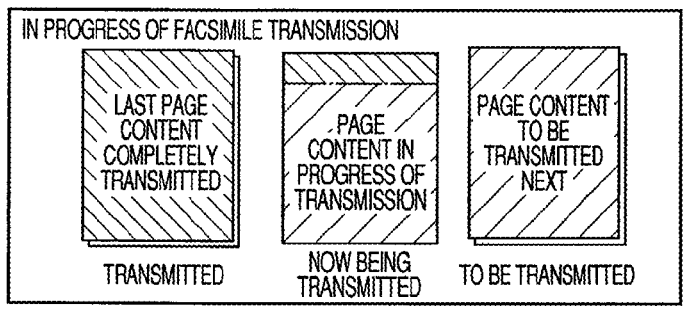
(f) FACSIMILE TRANSMISSION IS MADE AT NEXT PAGE
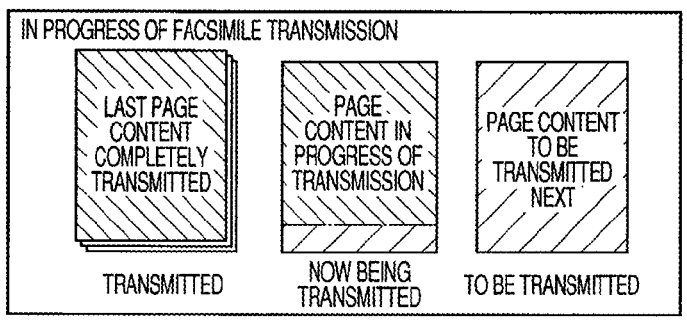
(g) ONLY ONE REMAINING PAGE TO BE TRANSMITTED BY FACSIMILE
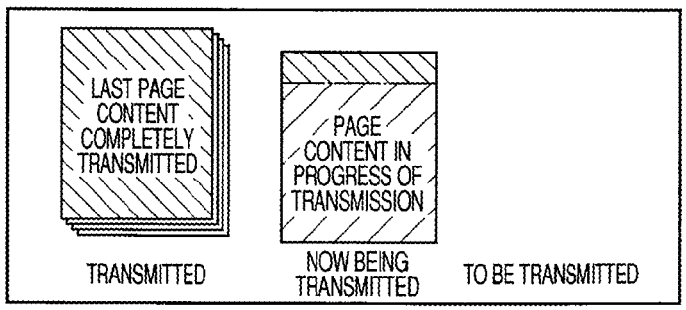
(h) NO PAGE EXISTS WHICH IS TO BE TRANSMITTED BY FACSIMILE
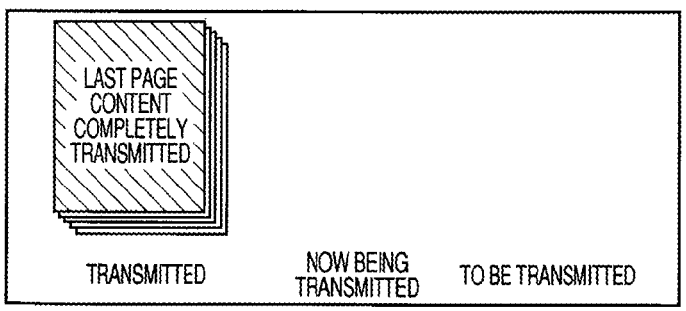
(i) COMPLETION OF FACSIMILE TRANSMISSION

IMAGE PROCESSING APPARATUS FOR VIEWING PROGRESS STATUS OF IMAGE OUTPUT PROCESSING

CROSS-REFERENCE TO RELATED APPLICATION

This application is a continuation application of U.S. patent application Ser. No. 11/689,236, filed on Mar. 21, 2007, which claims priority from Japanese Patent Application No. 2006-084257, filed on Mar. 24, 2006, the disclosure of which is incorporated herein by reference in its entirety.

TECHNICAL FIELD

Aspects of the present invention relate to an image processing apparatus having a display.

BACKGROUND

JP-A-2004-282382 discloses a network terminal device that displays image data in real time. This network terminal device writes a certain amount of compressed data into a preview buffer by decoding the data every time when receiving the certain amount of compressed data. The network device is capable of displaying the received data in real time in parallel with receiving the data.

In operations of various functions such as copying, sending facsimile and receiving facsimile, two types of processing are carried out concurrently with an operation of one function. For example, image reading processing+image recording processing are carried out for an operation of the function of copying. Image reading processing+image transmission processing are carried out for the operation of the function of transmitting a facsimile. Image receiving processing+image recording processing are carried out for the operation of the function of receiving a facsimile. Among two types of processing for an operation of one function, a status of only one processing is displayed according to the method for displaying in real time according to the display technique as disclosed in JP-A-2004-282382.

SUMMARY

An aspect of the present invention provides an image processing apparatus including a display and a display controller that controls the display to display thereon a page. When a first processing is currently performed on the page, the page includes: a first part, on which the first processing has not yet been performed; and a second part, on which the first processing has already been performed. When a second processing is currently performed on the page, the page includes: a third part, on which the second processing has not yet been performed; and a fourth part, on which the second processing has already been performed. The display controller controls the display to display the first part and the second part in different display modes. The display controller controls the display to display the third part and the fourth part in different display modes.

Another aspect of the present invention provides an image processing apparatus includes a display and a display controller that controls the display to display thereon a first page, on which a first processing is currently performed, and a second page, on which a second processing is currently performed. The first page includes a first part of the first page, on which the first processing has not yet been performed and a second part of the first page, on which the first processing has already been performed. The second page includes a third part of the second page, on which the second processing has not yet been performed and a fourth part of the second page, on which the second processing has already been performed. The display controller controls the display to display the first part of the first page and the second part of the first page in different display modes. The display controller controls the display to display the third part of the second page and the fourth part of the second page in different display modes.

BRIEF DESCRIPTION OF THE DRAWINGS

In the accompanying drawings:

FIG. 4 is an enlarged view of a display;

FIG. 12 is a view showing the last half of the transition example of input/output real-time display on the display.

DETAILED DESCRIPTION

Figure 1:
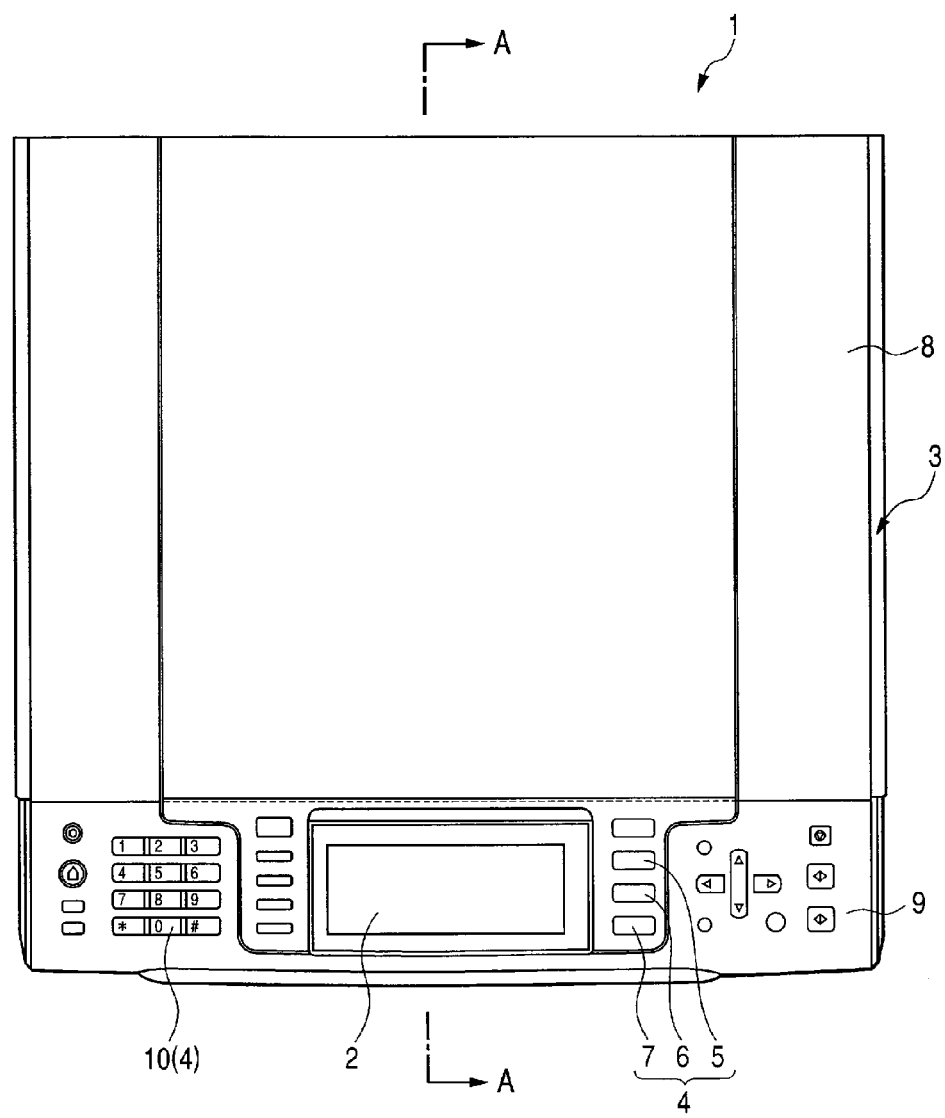
FIG. 1 is a plan view of an image processing apparatus according to a first aspect of the present invention.

Hereinafter, a description will be given of aspects of the present invention by referring to the drawings.
First Aspect Here, a description will be given of an aspect of the image processing apparatus including functions to copy, fax, print, scan and input/output a portable medium by referring to the drawings.

Figure 2:
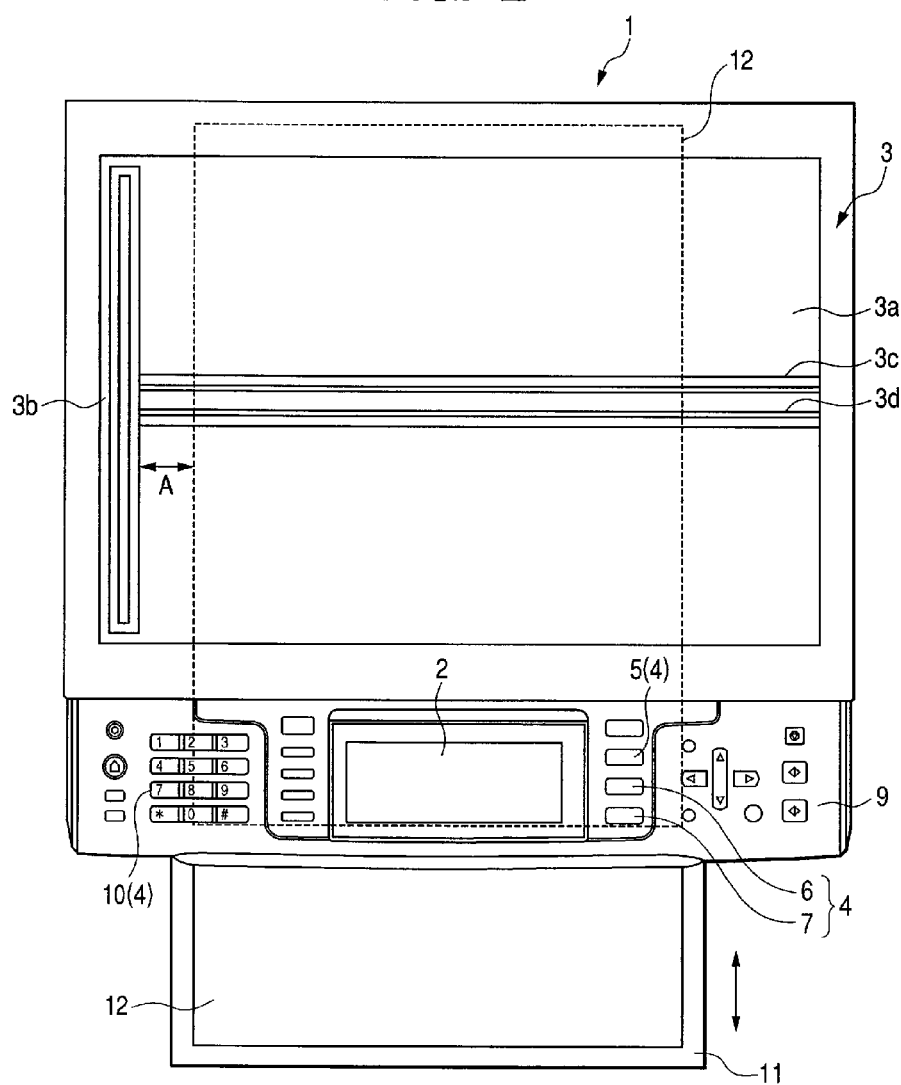
FIG. 2 is a plan view of the image processing apparatus while an original pressing plate is opened.

As shown in FIGS. 1 and 2, an image processing apparatus 1 is formed approximately in a square shape when viewed from above, and includes an operation panel 9 at the front face side on the upper face thereof. A scanner unit (image reading unit) 3 and an original pressing plate 8 are provided on the upper face of the image processing apparatus 1.

The operation panel 9 includes a display 2 and operation keys 4 such as a copy operation key 5, a facsimile operation key 6, a scanner operation key 7 and numeric keys 10.

The display 2 is arranged approximately at the center of the operation panel 9 in the width direction. The display 2 displays an image data of a medium (original) read by the scanner unit 3 and information when using functions to copy, fax, print and scan. The vertical width of the display 2 is set to be approximately equal to a length obtained by subtracting the vertical width of a read-surface protecting member 3a of the scanner unit 3 from the vertical width of a main body of the image processing apparatus 1. In other words, the display 2 is relatively large. Therefore the display displays individual image data in a large scale. The display 2 is formed in a horizontally-long rectangular shape and able to display a plurality of vertically-long image data (at least three) in parallel.

For example, as illustrated in FIG. 4, the display 2 is formed integrally by connecting in a horizontal direction two unit panels 19a and 19b having a ratio of the vertical width to the horizontal width of 3 to 4 (or 9 to 16). Further, an integrally formed protective base material 20 is provided on the surface of these two unit panels 19a and 19b. This configuration makes any boundary line between the unit panels 19a and 19b invisible so that users can clearly view the display 2. Each of the unit panels 19a and 19b includes a liquid crystal display (LCD).

Figure 5:
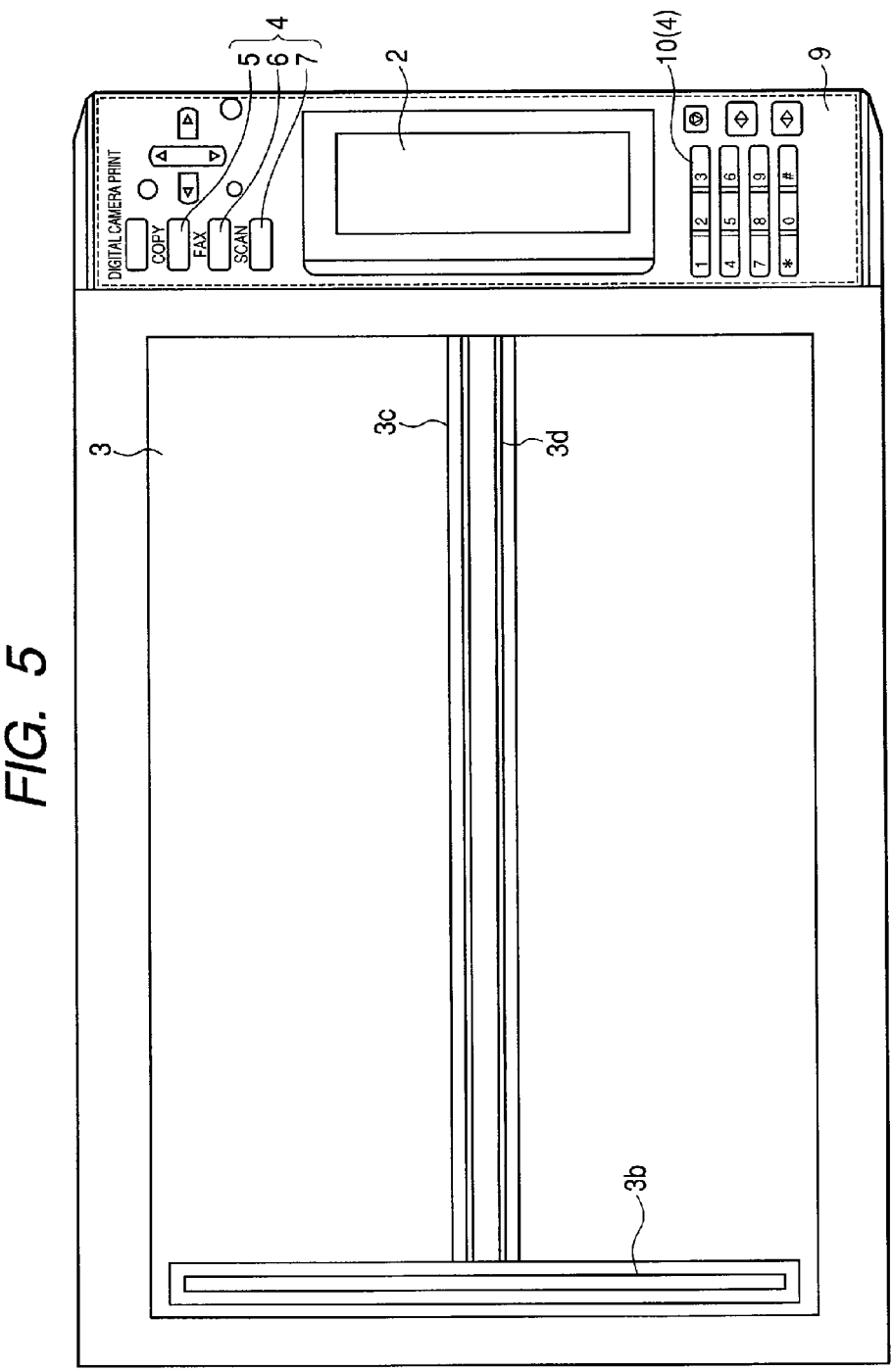
FIG. 5 is a view of an example of the image processing apparatus including the display arranged on the side of a scanner unit.

In FIG. 4, a description is given by using horizontally-long display 2. However, as illustrated in FIG. 5, a vertically-long display 2 may be used, which is similar in configuration.

The scanner unit 3 is a known scanner and formed in a size capable of reading, for example, an A4-size original but is not limited to such. The scanner unit 3 is formed in a rectangular shape when viewed from above and arranged so that the longer side is along the horizontal direction of the image processing apparatus. As illustrated in FIG. 2, the scanner unit 3 includes the read-surface protecting member 3a made of glass, etc., an image sensor 3b such as a contact image sensor, a shaft 3c, a driving belt 3d and others. A motor (not illustrated) drives the driving belt 3d, by which the image sensor 3b is moved in a direction of an arrow A shown in FIG. 2, and image data of an original placed on the read-surface protecting member 3a is read. The read image data is displayed in a color image on the display 2 and printed on a sheet 12 by using the operation keys 4.

The sheet 12, for example, A4-size sheet, is stacked and accommodated in a sheet tray 11. As illustrated in FIG. 2, the sheet tray 11 is provided so as to be taken in and out with respect to the image processing apparatus 1 from the front face thereof. As described above, the sheet 12 is placed in a vertical direction with respect to the main body of the apparatus, and the scanner unit 3 is placed in a horizontal direction. Thus, the image processing apparatus 1 is formed approximately in a square shape as a whole, when viewed from above.

Figure 3A:
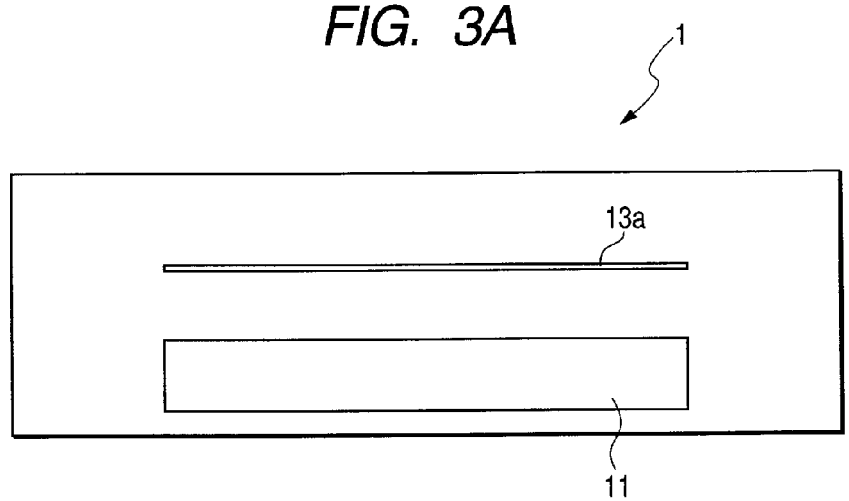
FIG. 3A is a front view of the image processing apparatus.
Figure 3B:
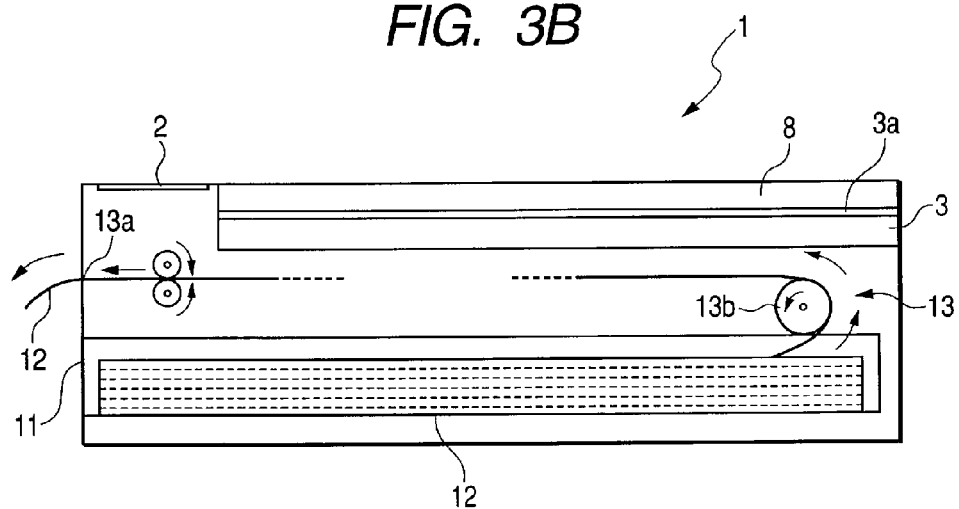
FIG. 3B is a brief sectional view of the image processing apparatus.

As illustrated in FIG. 3B, an image forming unit 13 is disposed below the scanner unit 3. The sheet tray 11 is disposed further below the image forming unit 13. When an image is printed on a sheet 12 in response to operation of the operation keys 4, an uppermost sheet of the sheet 12 placed in the sheet tray 11 is taken out and conveyed while the sheet 12 is U-turned in the longitudinal direction of the sheet 12, on which the image is printed by a print drum 13b. Further, a sheet discharge port 13a is formed at the front face of the image processing apparatus 1 and the printed sheet 12 is discharged from the sheet discharge port 13a to the front face of the apparatus main body. Thereby, the sheet 12 is discharged toward a user who is using the image processing apparatus 1 and the user can easily pick up the sheet 12.

Figure 6:
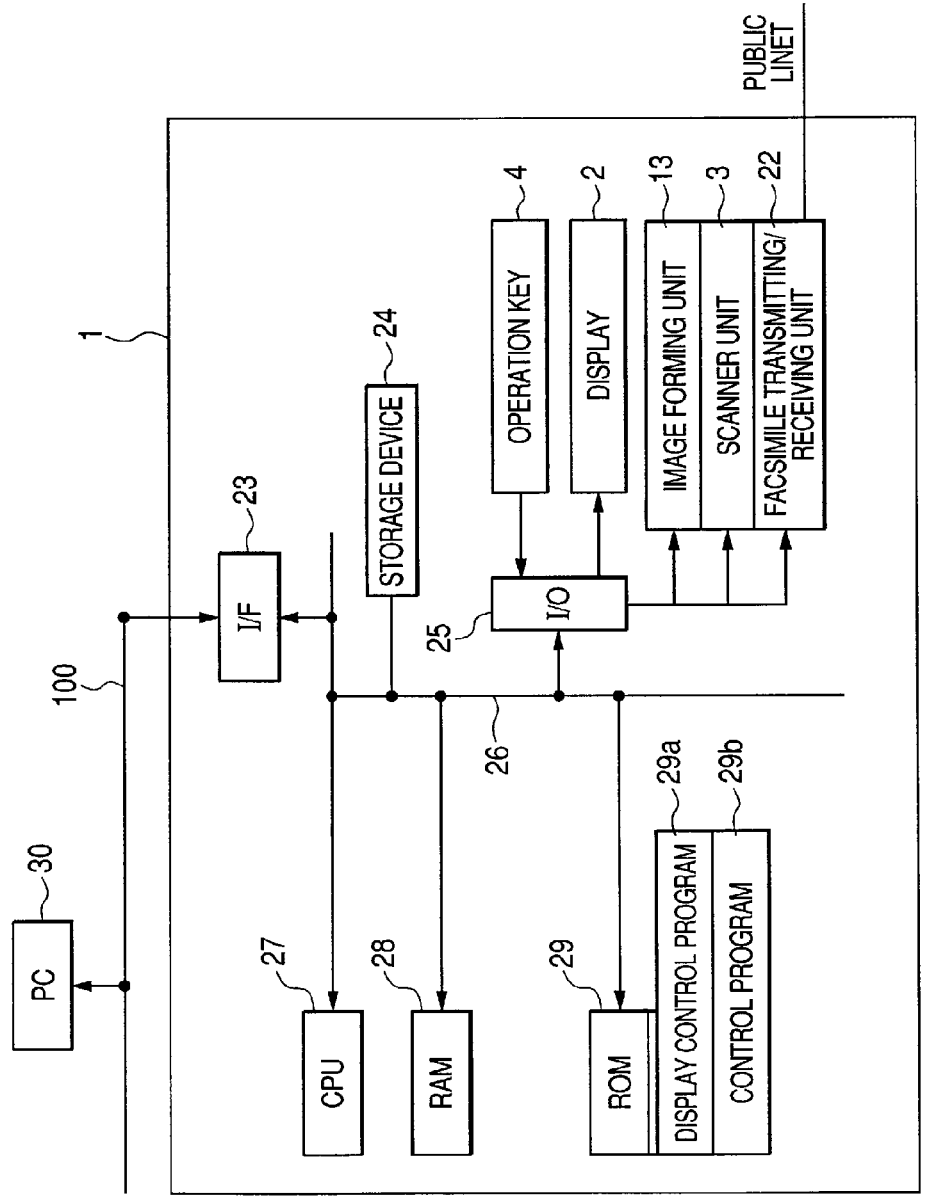
FIG. 6 is a circuit block diagram of the image processing apparatus.

Next, a description will be given of a circuit block diagram of the image processing apparatus 1 by referring to FIG. 6. The image processing apparatus 1 includes: a Central Processing Unit (CPU) 27; a Random Access Memory (RAM) 28; a Read Only Memory (ROM) 29 that stores various programs; a bus line 26 that is coupled therewith; an Input/Output (I/O) 25 coupled to the bus line 26; a storage device 24 coupled to the bus line 26 (which is, for example, a non-volatile memory such as an Electrically Erasable Programmable Read Only Memory (EEPROM) or a hard disk, or, alternatively, which is a portable medium such as a flush memory); and a communication interface 23 (indicated as I/F in FIG. 6) that is coupled to a communication network 100 to send and receive data with a personal computer 30. Either a wire communication interface or a wireless communication interface may be used as the communication interface 23. The I/O 25 is connected with the display 2, the scanner unit 3, the operation keys 4 and the image forming unit 13, as described above, as well as a facsimile transmitting/receiving unit 22. The facsimile transmitting/receiving unit 22 is connected to a public line.

The ROM 29 stores programs such as a display control program 29a and a control program 29b. The display control program 29a is a program for displaying a plurality of image data for a plurality of pages in parallel on the display 2. The control program 29b is a program for operating the image forming unit 13, the scanner unit 3 and the facsimile transmitting/receiving unit 22 in response to the operation of the operation keys 4.

Figure 7:
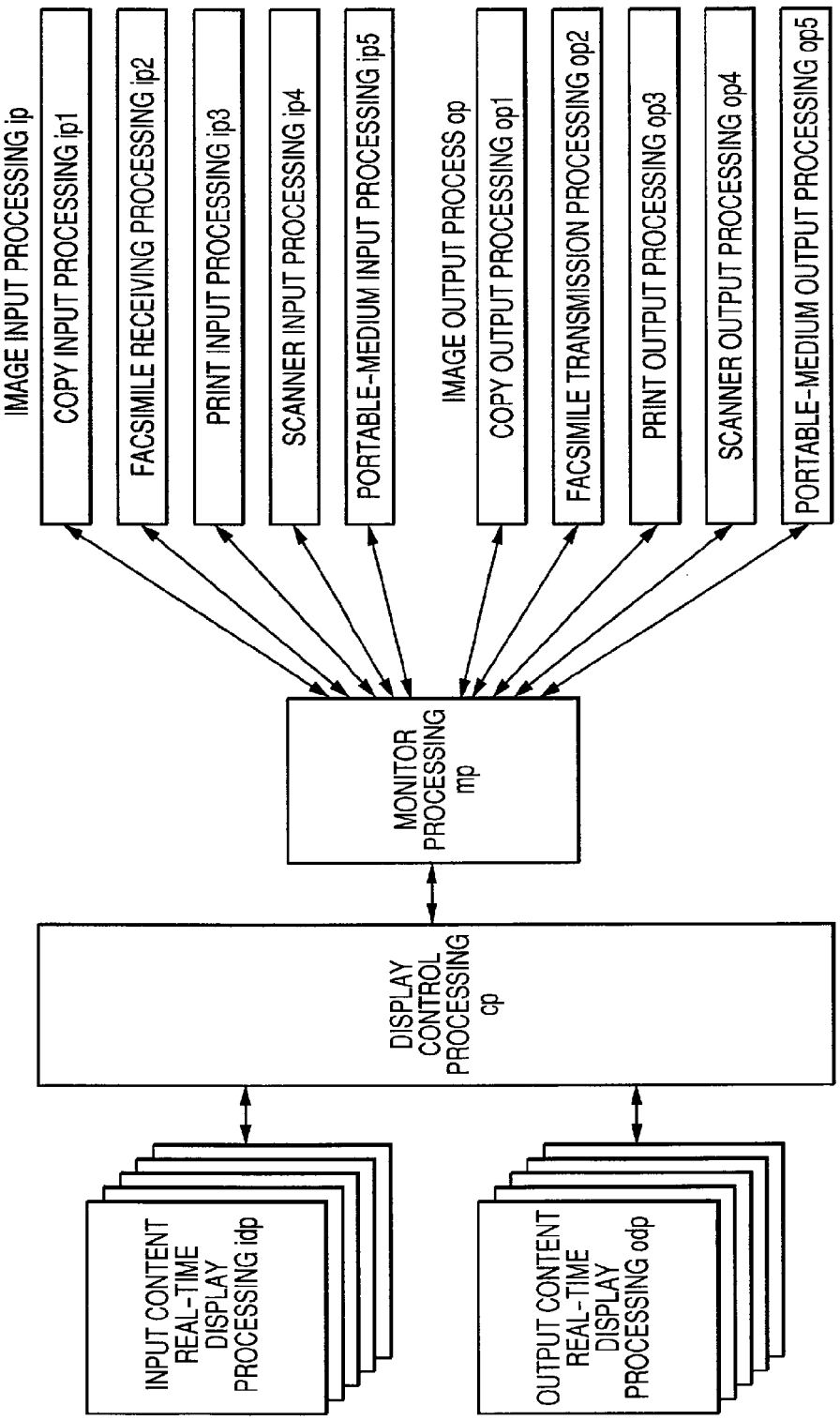
FIG. 7 is a view of a relationship of inter-processing communications for each processing.

FIG. 7 shows a relationship of inter-processing communications between a display control processing cp by the display control program 29a; a monitor processing mp; an image input processing ip including a copy input processing ip1, facsimile receiving processing ip2, a print input processing ip3, a scanner input processing ip4 and a portable-medium input processing ip5; an image output processing op including a copy output processing op1, a facsimile transmission processing op2, a print output processing op3, a scanner output processing op4 and a portable-medium output processing op5; an input content real-time display processing idp; and an output content real-time display processing odp. The display control processing cp and the image input processing ip communicates with each other via the monitor processing mp. The display control processing cp and the image output processing op communicates with each other via the monitor processing mp. The display control processing cp and the input content real-time display processing idp communicate with each other directly. The display control processing cp and the output content real-time display processing odp communicate with each other directly.

Figure 8:
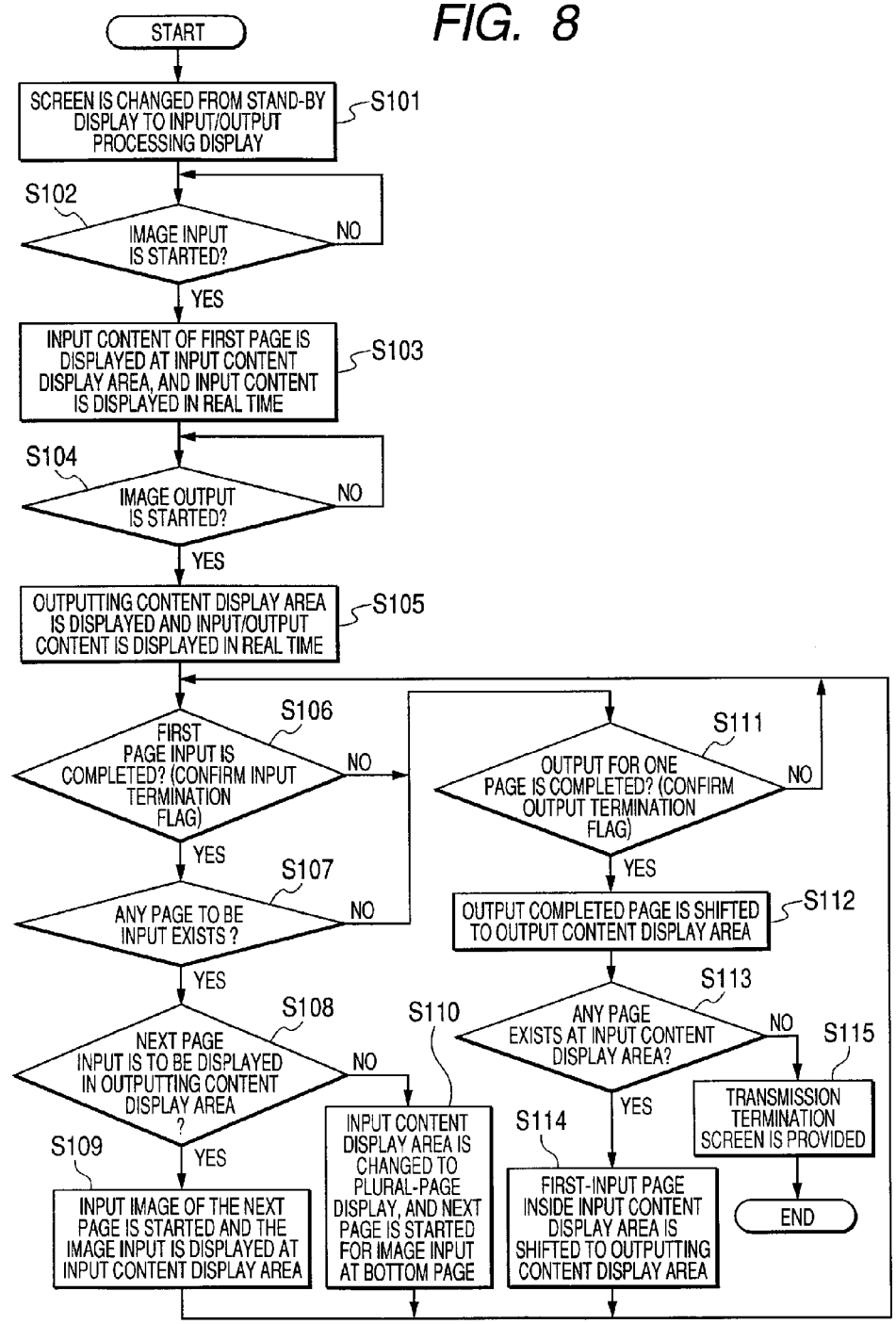
FIG. 8 is a flowchart of the display control processing by a display control program.

FIG. 8 shows a flowchart of the display control processing cp by the display control program 29a.

Figure 9:
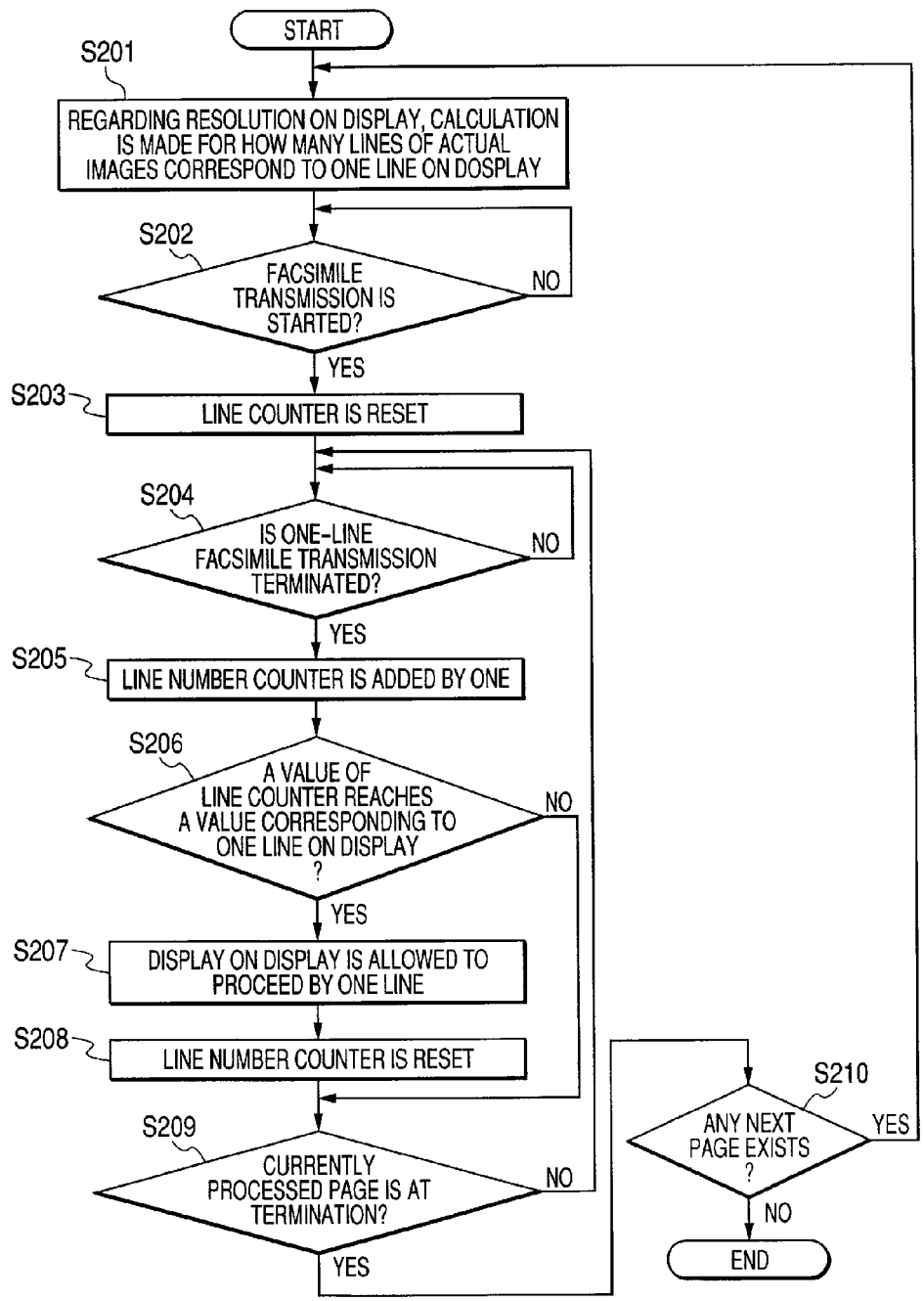
FIG. 9 is a flowchart of output content real-time display processing for facsimile transmission processing.

FIG. 9 shows a flowchart of the output content real-time display processing odp for the facsimile transmission processing op2. The output content real-time display processing odp for the facsimile transmission processing op2 performs display update in response to receiving a notification of progress from the facsimile transmission processing op2 or monitoring a counter of the facsimile transmission processing op2.

The input content real-time display processing idp for the scanner input processing ip4 includes substantially only displaying data which is saved in a RAM 28 by the scanner input processing ip4 as it is on the display 2. Therefore, a flowchart regarding the processing is not illustrated here.

Figure 10:
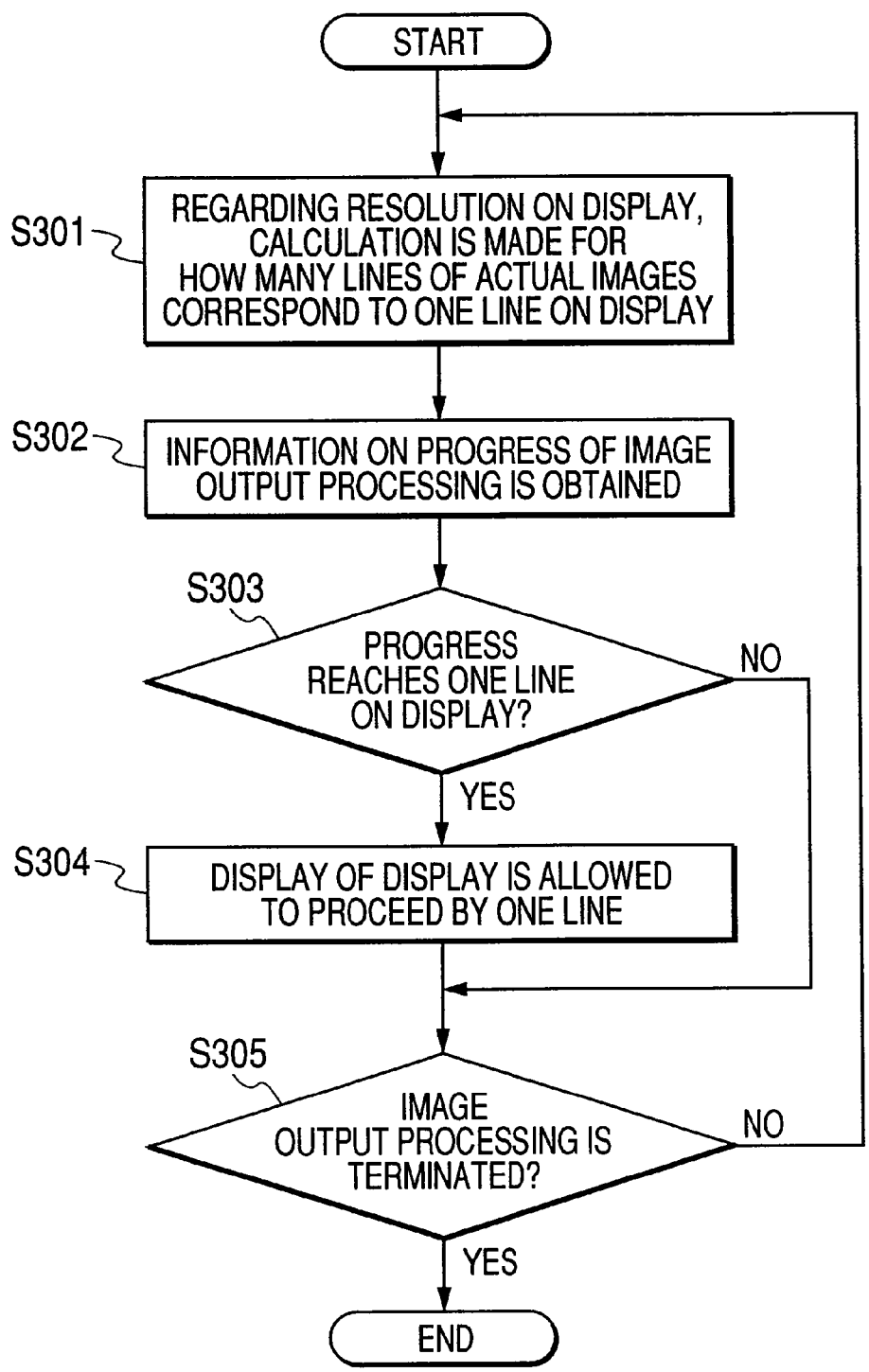
FIG. 10 is a generalized flowchart of output content real-time display processing.

FIG. 10 shows a generalized flowchart of the output content real-time display processing odp for various output processing. In general, the output content real-time display processing odp performs display update in response to receiving a notification of progress from the image output processing op or monitoring a counter of the image output processing op. Output content real-time display processing odp differs for every image output processing op, with the above point kept unchanged.

In general, the input content real-time display processing idp includes substantially only displaying data which is saved in the RAM 28 by the image input processing ip as it is on the display 2. Therefore, a flowchart regarding the process is not illustrated here.

Figure 11:
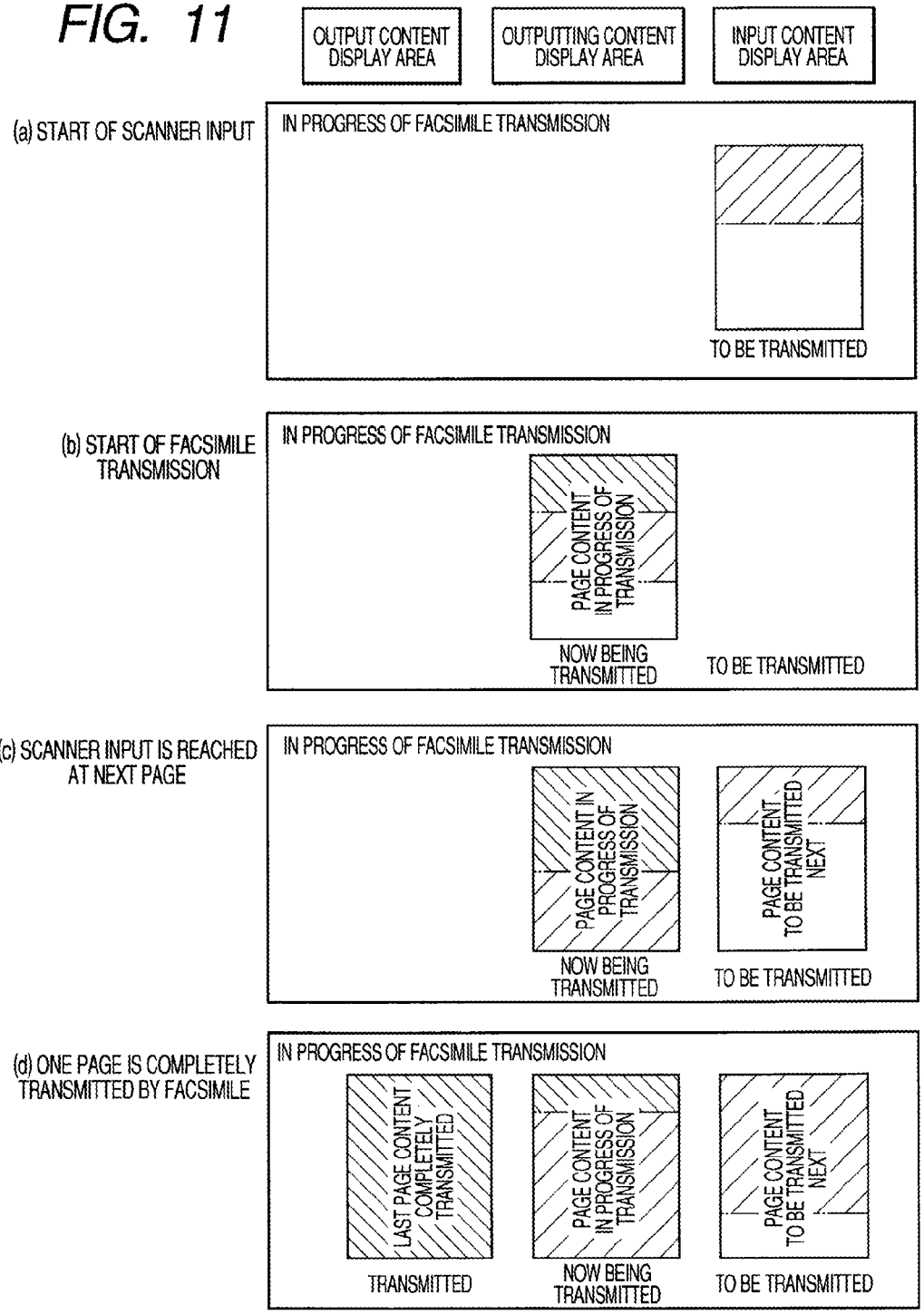
FIG. 11 is a view showing the first half of a transition example of input/output real-time display on a display.

FIG. 11 illustrates the first half of a transition example of an input/output real-time display on the display 2 of the image processing apparatus 1 according to the first aspect. In the transition example, three display areas, specifically, an input content display area at which the content of a page to be transmitted by facsimile is displayed, an outputting content display area at which the content of a page now being transmitted by facsimile is displayed and an output content display area at which the content of a page already transmitted by facsimile is displayed are arranged in this order in the display 2 from the right side.

FIG. 12 illustrates the last half of the transition example of a display on the display 2 of the image processing apparatus 1 according to the first aspect.

Next, a description will be given of operations of the thus configured image processing apparatus 1 according to the first aspect by referring to FIG. 1 to FIG. 12.

Hereinafter, a description will be given by exemplifying an operation of the facsimile transmission function, specifically, in a case where the image input processing ip is scanner input processing ip4 and the image output processing op is facsimile transmission processing opt.

When the operation keys 4 are operated to instruct facsimile transmission, the display control processing cp changes the screen of the display 2 from stand-by display to input/output processing display (S101 in FIG. 8).

Next, the display control processing cp determines whether image input is started (S102 in FIG. 8). In this instance, the display control processing cp determines to be YES when scanner input processing ip4 (original reading) is started at the scanner unit 3. In other words, upon receipt of a notification of starting the image input from the scanner input processing ip4, the display control processing cp determines that the scanner input processing ip4 has been started. Further, monitor processing mp monitors whether the scanner input processing ip4 is activated. Therefore, when information is obtained from the monitor processing mp that the scanner input processing ip4 has been activated or an activation flag set when the scanner input processing ip4 is activated is confirmed, it may be determined that the image input has been started.

The scanner input processing ip4 is started when operation keys 4 are depressed by a user. The scanner input processing ip4 reads an original by using an image sensor 3b of the scanner unit 3 and saves the read image data in the RAM 28 in real time. Upon start of the scanner input, the scanner input processing ip4 first obtains a value of the horizontal width of the original. The value of the horizontal width of the original is determined either by measuring the size of the original by the image sensor 3b or by being specified the size of the original by the user.

Then, the scanner input processing ip4 obtains the number of colors and values of resolution of image data to be generated by reading the original. The number of colors and the value of resolution of the generated image data depend on the image output processing op. Alternatively, they are limited in selection range and selected from the range by the user. Finally, the scanner input processing ip4 notifies the display control processing cp of starting image input. Further, every time the scanner input of the original for one page is terminated, the scanner input processing ip4 turns an "input termination flag" to ON. Further, every time the scanner input of a new page is started, the scanner input processing ip4 turns the "input termination flag" to OFF.

Upon receipt of a notification of starting the image input, the display control processing cp determines to be YES in "image input is started" (S102 in FIG. 8). A flag may be turned to ON instead of the notification. When it is determined that the image input has been started (S102: YES in FIG. 8), the display control processing cp displays image data on the first page at the input content display area of a display 2 and displays the image data in real time (S103 in FIG. 8). More specifically, the display control processing cp activates input content real-time display processing idp for the scanner input processing ip4 which displays the image data obtained from an original by the scanner input processing ip4 on the display 2 in real time.

The input content real-time display processing idp for the scanner input processing ip4, when activated, first obtains information about whether the image input processing ip is used to display image data to be saved in the RAM 28 in real-time. Monitor processing mp monitors which image input processing ip has been activated. Therefore, the information may be obtained from the monitor processing mp, or obtained by confirming an activation flag set when the scanner input processing ip4 is activated. The display control processing cp may have in advance obtained processing parameter information and the input content real-time display processing idp may obtain the processing parameter information. The input content real-time display processing idp obtains processing parameter information such as the horizontal width, number of colors and resolution of an original which is subjected to the scanner input processing ip4 to be displayed in real time. The display control processing cp may have in advance obtained processing parameter information from the scanner input processing ip4, and the input content real-time display processing idp may obtain the processing parameter information. Alternatively, the input content real-time display processing idp may read out the processing parameter information from a memory (RAM 28 or storage device 24) in which the scanner input processing ip4 stores the processing parameter information, or may inquire to the scanner input processing ip4.

The input content real-time display processing idp calculates how many bytes of data saved in the RAM 28 correspond to one line of the scanner input by referring to the processing parameter information. The input content real-time display processing idp also calculates to what extent the horizontal width the image data is displayed on the display 2 by referring to the processing parameter information. Further, the input content real-time display processing idp calculates how many lines of image data of the scanner input correspond to one line on the display 2 by referring to the processing parameter information.

Thereafter, the input content real-time display processing idp monitors the number of bytes of the image data saved in the RAM 28 and updates the display by every one display unit. The display unit may correspond to one line unit or several line units. One unit may be defined as every increase in the number of bytes. In this instance, the number of increased bytes is to be calculated and expressed so as to correspond to the number of portions of one line.

Thereafter, the display control processing cp carries out the scanner input processing ip4 and sends a notification to the output content real-time display processing odp for the scanner input processing ip4 by every progress of the scanner input processing ip4. A counter may increase its count instead of the notification.

Next, the display control processing cp determines to be YES in "image output is started" (S104 in FIG. 8), when facsimile transmission processing op2 is started at a facsimile transmitting/receiving unit 22, etc. A notification of the image output start is obtained from the facsimile transmission processing op2, by which it is determined that the facsimile transmission processing op2 has been started. Further, monitor processing mp monitors which image output processing op is activated. Therefore, it may be determined that image output has been started by obtaining information from the monitor processing mp that the facsimile transmission processing op2 has been activated or by confirming an activation flag set when the facsimile transmission processing op2 is activated.

The facsimile transmission processing op2 starts at the same timing as the start of the scanner input processing ip4. When the facsimile transmission processing op2 is activated, the transmission processing op2 first obtains information on which image input processing ip is used to output image data to be saved in the RAM 28. Monitor processing mp monitors which image input processing ip has been activated. Therefore, the information may be obtained from the monitor processing mp, or by confirming an activation flag set when the scanner input processing ip4 is activated. Next, the facsimile transmission processing op2 obtains processing parameter information such as the horizontal width, number of colors and resolution of an original processed by the scanner input processing ip4 which is inputting image data to be output. The facsimile transmission processing op2 reads out the processing parameter information from a memory (RAM 28 or storage device 24) in which the scanner input processing ip4 stores the processing parameter information, or may inquire to the scanner input processing ip4.

The facsimile transmission processing op2 calculates how many bytes of data saved in the RAM 28 allows facsimile transmission to start by referring to the processing parameter information. The facsimile transmission processing op2 turns "output termination flag" to ON, every time an original for one page is completely output. The facsimile transmission processing op2 turns the "output termination flag" to OFF every time the output of a new page is started. The scanner input processing ip4 monitors image data to be saved in the RAM 28, and when the data is sufficiently accumulated to carry out image output start, the facsimile transmission processing op2 sends a notification of the image output start to the display control processing cp via the monitor processing mp. The flag may be turned to ON instead of the notification.

When it is determined that image output has been started (S014: YES in FIG. 8), an "outputting content display area is displayed and the input/output content is displayed in real time" (S105 in FIG. 8). The display control processing cp activates output content real-time display processing odp for the facsimile transmission processing op2 which displays image data output by the facsimile transmission processing op2 on the display 2 in real time.

The output content real-time display processing odp for the facsimile transmission processing op2, when activated, first obtains information about the resolution from the facsimile transmission processing op2. The display control processing cp may have obtained in advance the processing parameter information from the facsimile transmission processing op2, and the output content real-time display processing odp may obtain the processing parameter information. Alternatively, the output content real-time display processing odp may read out the processing parameter information from a memory (RAM 28 or storage device 24) in which the facsimile transmission processing op2 stores the processing parameter information, or may inquire for the facsimile transmission processing op2. The output content real-time display processing odp calculates how many lines of image data correspond to one line on the display 2 by referring to the processing parameter information. Next, the output content real-time display processing odp obtains information which is notified by the facsimile transmission processing op2 at the start of facsimile transmission. Then, the output content real-time display processing odp obtains information which is notified by the facsimile transmission processing op2 every time one-line facsimile transmission is made. Next, the output content real-time display processing odp obtains information which is notified by the facsimile transmission processing op2 every time one-page facsimile transmission is terminated. It may be monitored whether an output termination flag is turned to ON.

Specifically, the output content real-time display processing odp for the facsimile transmission processing op2 obtains processing parameter information (for example, resolution) of the facsimile transmission processing op2 from the facsimile transmission processing op2. And, the output content real-time display calculates by referring to the processing parameter information, how much progress in the facsimile transmission processing op2 correspond the display 2 to update the display of one line, that is, how many lines of actual images correspond to one line on display (S201 in FIG. 9). For example, if the facsimile transmission processing op2 sends a notification by every one predetermined processing unit, calculation is made for how many notifications result in updating of the display. Further, if the facsimile transmission processing op2 does not send any notification but only has a counter for determining how many bytes of the facsimile transmission processing op2 are carried out, calculation is made for how many bytes of the facsimile transmission processing op2 are terminated to result in updating of the display.

Next, the output content real-time display processing odp for the facsimile transmission processing op2 determines whether the facsimile transmission processing op2 has started facsimile transmission (S202 in FIG. 9). If the facsimile transmission processing op2 starts the facsimile transmission (S202: YES in FIG. 9), the output content real-time display processing odp for the facsimile transmission processing op2 resets a line counter (S203 in FIG. 9). Next, the output content real-time display processing odp specifically in the facsimile transmission processing op2 judges whether one line has been transmitted by facsimile (S204 in FIG. 9). If one line has been transmitted by facsimile (S204: YES in FIG. 9), the output content real-time display processing odp for the facsimile transmission processing opt adds one in the line number counter (S205 in FIG. 9) and determines whether a value of the line counter has reached a value corresponding to one line on the display 2 (S206 in FIG. 9). If the value of the line counter has reached the value corresponding to one line on the display 2 (3206: YES in FIG. 9), the output content real-time display processing odp for the facsimile transmission processing op2 allows the display on the display 2 to proceed by one line (S207 in FIG. 9) and resets the line number counter (S208 in FIG. 9). If the value of the line counter does not reach the value corresponding to one line on the display 2 (S206: NO in FIG. 9), the output content real-time display processing odp for the facsimile transmission processing op2 skips the steps S207 and S208. Then, the output content real-time display processing odp for the facsimile transmission processing op2 determines whether the currently processed page is at termination (S209 in FIG. 9). If the page is not at the termination (S209: NO in FIG. 9), the processing is returned to the step S204 to repeat the steps S204 to S209. If the page is at the termination (S209: YES in FIG. 9), the output content real-time display processing odp for the facsimile transmission processing op2 determines whether a next page does exist (S210 in FIG. 9). If the next page exists (S210: YES in FIG. 9), the processing is returned to the step S201 to repeat the steps S201 to S210. If no page exists (S210: NO in FIG. 9), the output content real-time display processing odp for the facsimile transmission processing op2 is terminated.

Subsequently, the display control processing cp carries out the facsimile transmission processing op2 and sends a notification to the output content real-time display processing odp by every progress of the facsimile transmission processing op2. A counter may increase its count instead of the notification.

Next, the display control processing cp confirms the input termination flag, thereby determining whether one page is completely input (S106 in FIG. 8). If one page is not completely input (S106: NO in FIG. 8), the display control processing cp confirms the output termination flag, thereby determining whether one page, is completely output (S111 in FIG. 8). If one page is not completely output (S111: NO in FIG. 8), the display control processing cp returns the control to the step S106.

If one page is completely input (S106: YES in FIG. 8), the display control processing cp determines whether a next page to be input exists (S107 in FIG. 8). If the next page to be input does not exist (S107: NO in FIG. 8), the display control processing cp turns the processing to the step S111.

If a next page to be input exists (S107: YES in FIG. 8), the display control processing cp determines whether such next page input is to be displayed in the outputting content display area (S108 in FIG. 8). If the next page input is to be displayed in the outputting content display area (S108: YES in FIG. 8), the display control processing cp starts to input images of the next page and displays the input at the input content display area (S109 in FIG. 8) and returns the control to the step S106. If the next page input is not to be displayed in the outputting content display area (S108: NO in FIG. 8), the display control processing cp changes the input content display area to a plural-page display and starts to input the images of the next page at the bottom page (S109 in FIG. 8) and returns the processing to the step S106.

On the other hand, when the output termination flag is confirmed, and it is found that one page is completely output (S111: YES in FIG. 8), the display control processing cp shifts a completely output page to the output content display area (S112 in FIG. 8) and determines whether any page does exist at the input content display area (S113 in FIG. 8).

If any page exists at the input content display area (S113: YES in FIG. 8), the display control processing cp shifts a page which is input earliest in the input content display area to the outputting content display area (S114 in FIG. 8). And, the processing is returned to the step S106, if no page exists at the input content display area (S113: NO in FIG. 8), the display control processing cp provides the display 2 as a transmission termination screen and is terminated (S115 in FIG. 8).

FIG. 10 illustrates a general flowchart of the output content real-time display processing odp in which the image output processing op is not for the FAX transmission processing op2.

Specifically, the output content real-time display processing odp first obtains processing parameter information (resolution in the case of facsimile) of the image output processing op from the image output processing op and calculates by referring to the processing parameter information how much progress in the image output processing op correspond the display 2 to update the display of one line, that is, how many lines of actual images correspond to one line on display (S301 in FIG. 10). For example, if the image output processing op sends a notification by every predetermined processing unit, calculation is made for how many notifications result in updating of the display. Further, if the image output processing op does not send any notification but only has a counter for determining how many bytes of the image output processing op are carried out, calculation is made for how many bytes of the image output processing op are terminated to result in updating of the display.

Then, the output content real-time display processing odp monitors the progress of the image output processing op (S302 in FIG. 10). In other words, the output content real-time display processing odp obtains information about the progress of the image output processing op. Then, the output content real-time display processing odp determines whether to update the display (S303 in FIG. 10). In other words, it is determined whether the progress has reached one line on the display 2. When it is determined that the display should be updated (S303: YES in FIG. 10), the output content real-time display processing odp allows the display on the display 2 to proceed by one line (S303 in FIG. 10). Finally, the output content real-time display processing odp determines whether the image output processing op is terminated (S305 in FIG. 10). If the image output processing op is not terminated (S305: NO in FIG. 10), the processing is returned to the step S301 to repeat the steps S301 to S305. If the image output processing op is terminated (S305: YES in FIG. 10), the output content real-time display processing odp is terminated.

Next, a description will be given of a transition example of the display on the display 2 of the image processing apparatus 1 according to the first aspect by referring to FIGS. 11 and 12.

At the start of scanner input, as illustrated in (a) of FIG. 11, the read image data is displayed in real time. Specifically, a page frame is displayed at the input content display area, and the read image data to be transmitted by facsimile (left-oblique line part) is displayed in the page frame. According to this configuration, with respect to a page on which image input processing is currently performed, a part of the page, on which image input processing has already been performed and a part of the page on which the image input processing has not yet been performed are displayed in different display modes. Herein, the display mode is defined by background color, brightness of the displayed page and so on. For example, the background color of the part, on which image input processing has already been performed is white, and the background color of the part, on which image input processing has not yet been performed is gray. However, the display mode is not limited to them, unless the user can recognize each part of the page by a difference between the display modes. It may be possible to easily understand how far the image input processing of the page has progressed.

At the start of a facsimile transmission, as illustrated in (b) of FIG. 11, image data which has been transmitted by facsimile (right-oblique line part) is displayed, while a part corresponding to the read image data (left-oblique line part) extends in real time. Specifically, a page frame is shifted from the input content display area to the outputting content display area, and image data which has been read and transmitted by facsimile (right-oblique line part) and image data which has been read but not yet transmitted by facsimile (left-oblique line part) are displayed so as to be in contact with each other at the boundary. According to this configuration, with respect to a page on which image output processing is currently performed, a part of the page, on which image output processing has already been performed and a part of the page, on which image output processing has not yet been performed are displayed in different display modes. In addition, with respect to a page on which image input processing is currently performed, a part of the page, on which image input processing has already been performed and a part of the page on which the image input processing has not yet been performed are displayed in different display modes. It may be possible to easily understand how far the image output processing and the image input processing have progressed as a whole process of the image processing.

When scanner input has reached a next page, as illustrated in (c) of FIG. 11, the read image data (left-oblique line part) is further displayed. Specifically, a new page frame is added to the input content display area and image data to be transmitted by facsimile (left-oblique line part) is displayed in the page frame. According to the configuration, a page on which the image output processing is currently performed and a page on which the image input processing is currently performed are displayed at the same time. It may be possible to easily understand how far the image input/output processing has progressed as a whole process of the image processing.

When facsimile transmission of a page is completed, as illustrated in (d) of FIG. 11, a page frame for the page completely transmitted by facsimile (right-oblique line party is shifted to the output content display area, and a page on which the facsimile transmission has finished being performed just before the page on which the facsimile transmission is currently performed is displayed at the output content display area. In addition, a page which is to be transmitted next by facsimile is displayed at the input content display area. According to the configuration, a page on which the image output processing is currently performed and a page on which the image output processing has finished being performed are displayed at the same time. It may be possible to easily understand how far the image output processing has progressed as a whole process of the image processing. Further, the page on which the image output processing is currently performed and the page on which the image output processing has finished being performed are displayed at different positions on the display. It may be possible to compare the page on which the image output processing is currently performed with the page on which the image output processing has finished being performed and also to distinguish them easily. Further, since the page on which the image output processing is currently performed, the page on which the image output processing has finished being performed and either a page on which the image input processing is currently performed or a page on which the image input processing has already been performed and the image output processing has not yet been performed are displayed at different positions. It may be possible to compare the page on which the image output processing is currently performed, the page on which the image output processing has already been performed and either the page on which the image input processing is currently performed or the page on which the image input processing has already been performed and the image output processing has not yet been performed, with one another to distinguish three of them easily. Further, the pages are displayed in the order according to the progress of the image input/output processing. It may possible to easily understand how far a whole process of the image processing has progressed.

When scanner input is made at a next page, as illustrated in (e) of FIG. 12, a page to be transmitted next to the page being transmitted by facsimile is displayed at a top and the scanner input is allowed to proceed. And, a plurality of pages on which the image input processing has already been performed overlaps with one another while being shifted in relation to one another. According to the configuration, a plurality of pages on which the image input processing are currently performed or on which the image input processing has already been performed and the image output processing has not yet been performed are displayed overlapped one another while being shifted in relation to one another. It may be possible to easily understand how many pages on which the image input processing is currently performed or the image input processing has already been performed and on which the image output processing has not been performed exist. Further, the page on which the image output processing is currently performed is compared with a page which is next subjected to image output processing. It may be possible to easily find out a skipped page which is not subjected to image input processing.

When facsimile transmission is made at a next page, as illustrated in (f) of FIG. 12, a page completely transmitted by facsimile is displayed on top of the output content display area, and a next page is displayed at the outputting content display area. In this instance, a page other than the page on top of the output content display area is also at a display mode for a page that is completely transmitted by facsimile. According to this configuration, a page subjected to image output processing just before a page on which the image output processing is currently performed is displayed at a top among a plurality of pages on which the image output processing has already been performed. It may be possible to easily understand how many pages completely subjected to image output processing exist. Further, a page on which the image output processing is currently performed is compared with that subjected to image output processing just therebefore. It may be possible to easily find out a skipped page which is not subjected to image output processing.

When only one page to be transmitted by facsimile remains, as illustrated in (g) of FIG. 12, image input processing is halted and a page on which the image input processing is currently performed does not exist.

When a page to be transmitted by facsimile does not exist, as illustrated in (h) of FIG. 12, a page frame displayed at the input content display area is deleted.

When facsimile transmission is completed, as illustrated in (i) of FIG. 12, a page frame displayed at the outputting content display area is deleted, and consequently, only the content of a page completely transmitted by facsimile remains at the output content display area.

Figure 13A:
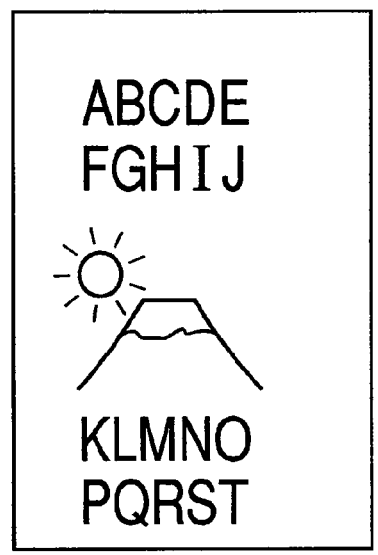
FIGS. 13A and 13B are views showing examples of a page displayed on the display.
Figure 13B:
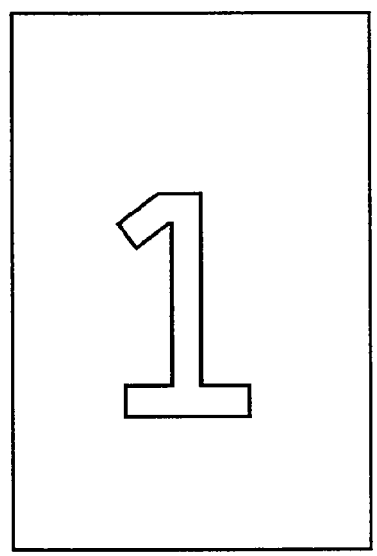

FIGS. 13A and 13B are views showing examples of a page displayed on the display. The page displayed on the display is not limited to an image (content) of the page as shown in FIG. 13A. The page displayed on the display may include information indicating the page in a document to be processed. For example, the page displayed on the display is the number of the page included in a document to be processed as shown in FIG. 13B.

The operation according to the first aspect is described as an example of the operation of the facsimile transmission function, that is, in a case where the image input processing ip is the scanner input processing ip4 and the image output processing op is the facsimile transmission processing op2. However, it is a matter of course that the operation of the function in the image processing apparatus 1 is not limited only to the operation of the facsimile transmission function. A description can be given of the operation of the function provided by a combination of any one function of image input processing ip with any one function of image output processing op. For example, in a case of an operation of the copy function, the operation can be described by a combination of the scanner input processing ip4 with the print output processing op3. Further, in a case of the operation of the facsimile receiving function, the operation can be described by a combination of the facsimile receiving processing ip2 with the print output processing op3.

In other words, the image output processing may include a processing of at least one of a copy output function, a facsimile transmitting function, a print output function, a scanner output function and a portable-medium output function. According to the configuration, it may be possible to easily understand a progress status of the image output processing for the copy output function, facsimile transmission function, print output function, scanner output function and portable-medium output function and also easily find out a skipped page in the image output processing.

In addition, the image input processing may include a processing of at least one of a copy input function, a facsimile receiving function, a print input function, a scanner input function and portable-medium input function. According to the configuration, it may be possible to easily understand a progress status of the image input processing for the copy input function, facsimile receiving function, print input function, scanner input function and portable-medium input function and also easily find out a skipped page in the image input processing.

According to aspects of the invention, a status of two or more types of processing for the operation of one function may be confirmed by displaying a page on which image output processing is currently performed on a display and also displaying a part of the page on which the image output processing has already been performed and a part of the page on which the image output processing has not yet been performed in different display modes in real time.

Description has been so far given of aspects of the present invention, which are, however, only examples. The present invention is not limited thereto and may be modified in various ways on the basis of knowledge of a person skilled in the art, as long as not departing from the gist of the scope of the claims.

What is claimed is:

1. An image processing apparatus comprising:
   a display; and
   a display controller configured to control the display to display a screen including a first display area and a second display area adjacent to the first display area and display in the first display area a processing page on which a processing is currently performed, the processing page including:
      a first part, on which the processing has not yet been performed; and
      a second part, on which the processing has already been performed,
   wherein the display controller is configured to control the display to display the first part of the processing page and the second part of the processing page in different display modes,
   wherein the display controller is configured to control the display to further display, simultaneously with the processing page, a plurality of processed pages on which the processing has already been performed in the second display area such that each time when the processing on the processing page on which the processing is currently performed has been completed, the completed processing page is displayed on a top of the plurality of processed pages to be overlapped thereon as the plurality of processed pages are shifted in relation to one another.

2. The image processing apparatus according to claim 1, wherein the processing comprises an image output processing.

3. The image processing apparatus according to claim 2, wherein the image output processing comprises at least one of a copy output function, a facsimile transmitting function, a print output function, a scanner output function and a portable-medium output function.

4. The image processing apparatus according to claim 1, wherein the display controller is configured to control the display to display one of the plurality of processed pages, which is the latest processed page of the plurality of processed pages, at a top of the displayed plurality of processed pages.

5. The image processing apparatus according to claim 1, wherein the displayed processing page includes the number of the processing page in a document to be processed.

6. The image processing apparatus according to claim 1, wherein the display controller is configured to control the display to display the screen to further include a third display area adjacent to the first display area such that the first display area is provided between the second display area and the third display area, and further display in the third display area a pre-processing page, on which the processing has not yet been performed.

7. The image processing apparatus according to claim 6, wherein the display controller is configured to control the display to display in the third display area a plurality of pre-processing pages, on which the processing has not yet been performed, while being shifted in relation to one another, and
   wherein when the processing on the processing page, on which the processing is currently performed, has been completed, the processing starts to be performed on a top page of the plurality of pre-processing pages, and the display controller is configured to control the display to display in the first display area the top page of the plurality of pre-processing page as the processing page.

8. The image processing apparatus according to claim 6, wherein each time when the processing on the processing page, on which the processing is currently performed, has been completed, the processing starts to be performed on the pre-processing page, and the display controller is configured to control the display to display the processing page on the top of the processed pages in the second display area and display in the first display area the pre-processing page, on which the processing starts to be performed.

9. A non-transitory storage medium having a program stored thereon and readable by a processor, the program, when executed by the processor, causing the processor to function as:
   a display controller configured to control a display to display a screen including a first display area and a second display area adjacent to the first display area and display in the first display area a processing page on which a processing is currently performed, the processing page including:
      a first part, on which the processing has not yet been performed; and
      a second part, on which the processing has already been performed,
   wherein the display controller is configured to control the display to display the first part of the processing page and the second part of the processing page in different display modes,
   wherein the display controller is configured to control the display to further display, simultaneously with the processing page, a plurality of processed pages on which the processing has already been performed in the second display area such that each time when the processing on the processing page on which the processing is currently performed has been completed, the completed processing page is displayed on a top of the plurality of processed pages to be overlapped thereon as the plurality of processed pages are shifted in relation to one another.

10. The non-transitory storage medium according to claim 9,
wherein the processing comprises an image output processing.

11. The non-transitory storage medium according to claim 10,
wherein the image output processing comprises at least one of a copy output function, a facsimile transmitting function, a print output function, a scanner output function and a portable-medium output function.

12. The non-transitory storage medium according to claim 9,
wherein the display controller is configured to control the display to display one of the plurality of processed pages, which is the latest processed page of the plurality of processed pages, at a top of the displayed plurality of processed pages.

13. The non-transitory storage medium according to claim 9,
wherein the displayed processing page includes the number of the processing page in a document to be processed.

* * * * *